Patented Oct. 8, 1940

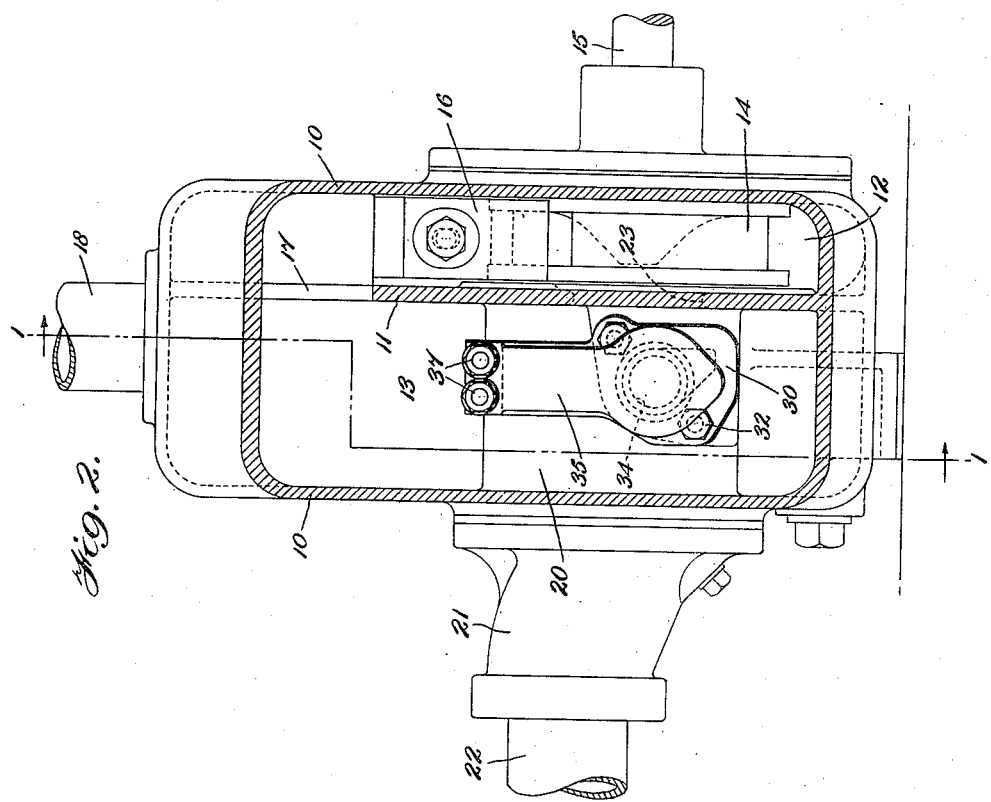
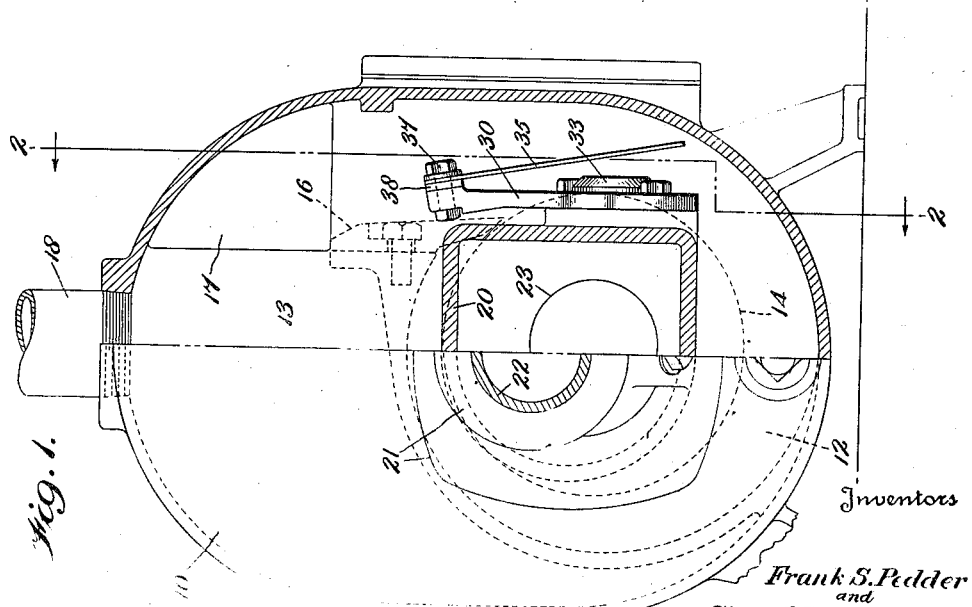

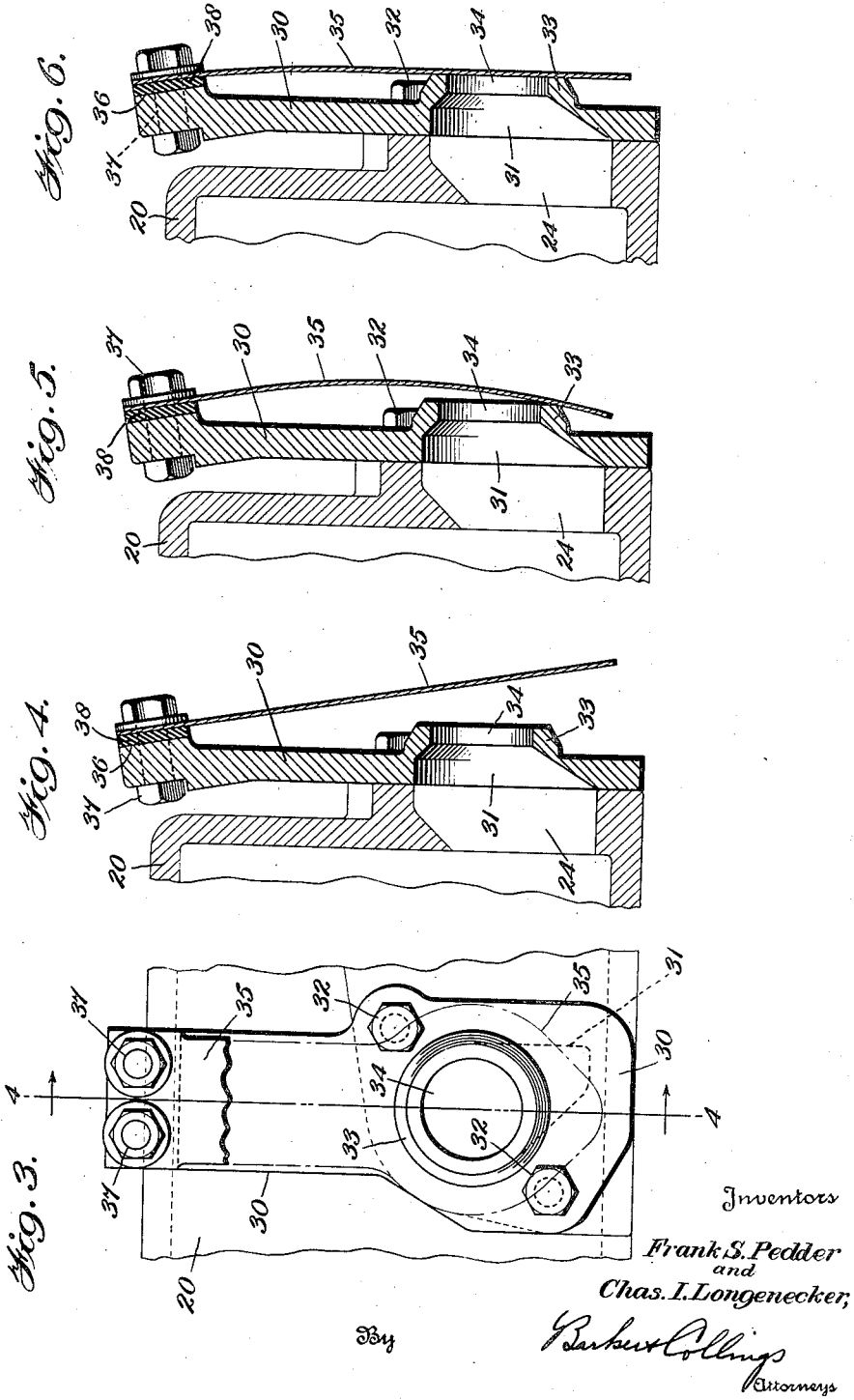

2,217,380

UNITED STATES PATENT OFFICE 2,217,380

VALVE STRUCTURE

Frank S. Pedder, Milwaukee, and Charles I. Longenecker, Wauwatosa, Wis., assignors to Chain Belt Company, Milwaukee, Wis., a corporation of Wisconsin Application February 4, 1938, Serial No. 188,799

3 Claims. (Cl. 251—119)

This invention relates to valves of the type in which a resilient leaf or tongue is fixedly mounted in position to be moved by pressure or velocity of the material being handled to or from a seat associated with a material port, for controlling the flow of the material through such port; and it has for its principal object to improve prior constructions of this type in such manner as to materially decrease the percentage of breakage of the valve members resulting from fatigue of their metal due to repeated flexings.

A further object of the invention is to associate a supplemental yielding or resilient member with the resilient valve leaf or tongue in such manner that when the valve member flexes to control the port, the said supplemental member will yield and so distribute the strains set up in the valve tongue incidental to its bending that the operative life of the said tongue will be materially lengthened.

In another aspect, the invention has for a further object the employment of a valve of the type above set forth in a self-priming centrifugal pump of the recirculating type to control the flow of priming fluid therein, the construction being such that the valve throttles or only partially closes off the flow of priming liquid during a portion of the priming operation, and then snaps to completely closed position as priming is completed.

With the above and other objects in view which will appear as the description proceeds, the invention consists in the novel details of construction, and combinations and arrangements of parts, more fully hereinafter described and particularly pointed out in the appended claims.

Since the invention has been developed primarily in connection with valves employed for controlling the flow of priming fluid in recirculating self-priming rotary pumps, in which field it has already received extensive practical tests, for purposes of disclosure it has been illustrated in the accompanying drawings, forming part of this specification, as associated with a known commercial form of such a pump, although as will be readily appreciated from the following description, it is not limited solely to such an application.

In the said drawings:

Figure 1 is a partly elevational, partly sectional view of a well known commercial form of recirculating self-priming centrifugal pump, as viewed from the intake end, and showing a valve structure in accordance with the present invention in position therein to control the flow of priming fluid, the sectional portion of the view being taken approximately on the plane indicated by the line 1—1 of Fig. 2;

Fig. 2 is a transverse sectional elevational view of the parts shown in Fig. 1, taken approximately on the plane indicated by the line 2—2 of Fig. 1, looking in the direction of the arrows;

Fig. 3 is an enlarged elevational view of the valve structure shown in Figs. 1 and 2, with the valve leaf or tongue being partly broken away for the sake of better illustration of certain of the parts behind it;

Fig. 4 is a central vertical sectional view through the valve structure as shown in Fig. 3, taken on the plane indicated by the line 4—4 of the said figure, and showing the valve in its normal or open position;

Fig. 5 is a view similar to Fig. 4, but illustrating the valve member in its partly closed or throttling position; and Fig. 6 is a view similar to Figs. 4 and 5, but illustrating the fully closed position of the valve.

The pump shown in Figs. 1 and 2 may be briefly described as comprising a housing 10 having an inner partition wall 11 dividing it into an impeller chamber 12 and a priming-fluid chamber 13. An impeller 14 carried by a drive shaft 15 is mounted in the chamber 12, and may have a "peeler" 16 associated with it, as fully described in prior U. S. Patent No. 1,989,061, granted January 22, 1935, on an application filed by Charles I. Longenecker. The upper portion of the partition 11 is provided with a port 17 through which fluid may be forced by the impeller 14 into the chamber 13, from which it may pass through the outlet pipe 18. An inlet fluid conduit 20 extends horizontally through the chamber 13 from the front wall of the housing 10 to the partition 11, and contains an inlet check valve (not shown) carried by a fitting 21, to which is attached the inlet or suction pipe 22. The inlet conduit 20 communicates with the impeller chamber 12 through a port 23 in the partition 11, and the said conduit 20 has a passage 24 through its side wall through which the priming fluid may pass from chamber 13. It is this passage 24, best shown in Figs. 4, 5 and 6, which the valve of the present invention is designed to control.

This valve structure comprises a base or supporting member 30 of generally rectangular form, having adjacent one end a passage 31 adapted to register with the passage 24 when the member is secured in position on the side of the inlet conduit 20 by the bolts 32. The support is also preferably provided with a boss 33 having a port 34 communicating with the passage 31, and the flat front face of the boss surrounding the said port constitutes a valve seat for the elongated resilient valve leaf or tongue 35. The upper end of the member 30 is provided with an inclined face 36 to which the upper end of the tongue 35 is secured by the bolts 37, with a rubber or similar yielding or resilient member or pad 38 interposed between them. The valve member 35 is preferably formed of straight flat sheet bronze, so that when secured to the inclined face 36 as just described it has a normal bias to open position, as shown in Figs. 1 and 4.

The operation of self-priming pumps of the type here shown and described is well known, and is fully disclosed, for example, in the prior U. S. Patent No. 2,022,624 granted November 26, 1935, on an application filed by Charles I. Longenecker, so that it need not be here set forth in detail. Suffice it to say, however, that when the pump is fully primed and operating normally to discharge liquid through pipe 18, the priming fluid control valve, such as that of the present invention, is fully closed, as illustrated in Fig. 6, so that the flow of priming fluid from chamber 13 to intake conduit 20 is cut off. When the pump sucks air and "loses its prime," due to failure of the liquid supply to pipe 22, or to other causes, the vacuum created by the impeller 12 in the intake conduit 20 falls, whereupon the valve, such as 35, opens and permits liquid from chamber 13 to pass through passage 24 to intake conduit 20, from whence it is sucked by the impeller through port 23 and forced back to chamber 13 through port 17.

With the restoration of the supply of liquid to pipe 22, the vacuum in intake chamber 20 begins to build up again, as the air is sucked out of said pipe 22, and as this happens the priming fluid control valve is drawn toward its seat. In the case of the valve structure of the present invention, the resilient tongue 35 is bowed, due in part to the partial vacuum condition in intake conduit 20, and in part to the velocity and pressure of the priming liquid from chamber 13, until its lower portion contacts the lower portion of the valve seat, substantially as illustrated in Fig. 5, in which position it throttles down the flow of the priming liquid. This condition continues until the last air is sucked from the pipe 22 and conduit 20, so that these passages are completely filled with liquid and the pump is fully primed. As this occurs, the vacuum condition in conduit 20 builds up rapidly to approximately 14 lbs. per sq. in., which has the effect of snapping the valve tongue into contact with the seat all around its periphery, as illustrated in Fig. 6, thus completely cutting off the flow of priming liquid.

Actual experience under practical working conditions with valves constructed as herein shown and described except that the resilient pad or member 38 was omitted, has shown a relatively short life for the valve tongues 35 and a high percentage of breakage thereof apparently due to fatigue of the metal adjacent the lower edge of face 36. However, our tests have conclusively demonstrated that when the resilient pads or members 38 are employed as shown, breakage from this cause is substantially eliminated. This we believe to be due to the fact that the pad cushions the tongue at this point and distributes the strains induced therein by flexing, with the result that the metal does not become fatigued, and the life of the tongues is therefore greatly prolonged.

While for this particular application a valve biased to open position is desired, it will be readily understood that the resilient pads may also be employed with similar valves biased to closed position, in which event the pads would be placed on the opposite side of the tongues.

While one form of the invention has been illustrated and described it is obvious that those skilled in the art may vary the details of construction as well as the precise arrangement of parts without departing from the spirit of the invention, and therefore it is not wished to be limited to the above disclosure except as may be required by the claims.

What is claimed is:

1. In valve structure of the class described, a support having a fluid port; a flexible valve tongue secured to said support for flexing movements toward and from said port, said tongue being normally spaced from the port to permit the passage of fluid therethrough; and a resilient member disposed between said tongue and support at the point of securement, arranged to continuously prevent entry of foreign material therebetween, and to yield as the tongue flexes toward the port, thereby distributing the flexing strains induced by such movement and reducing the liability of breakage of the tongue.

2. In valve structure of the class described, a support having a fluid port; a flat resilient valve tongue secured to said support in position to extend across and control said port, said tongue normally occupying a position spaced from the port to permit the passage of fluid therethrough; and a resilient member clamped between said tongue and support at the point of securement, with the opposite faces of said member in continuous contact with the companion areas of the tongue and support to exclude foreign matter therefrom at all times, said member being arranged to yield as the tongue moves toward the port and thereby distribute the flexing strains induced in the tongue by such movement and reduce the liability of breakage of the tongue.

3. In valve structure of the class described, an elongated support having a fluid port adjacent one end and an inclined face adjacent the other; a flat resilient valve tongue secured to the latter end of said support in a plane parallel to that of said inclined face and extending across said port in angularly spaced relation to the face surrounding it; and a rubber pad clamped between said tongue and inclined face of the support, arranged to at all times exclude foreign material from between the two, and to be compressed as the tongue flexes toward the port, to thereby distribute the flexing strains induced in the tongue and reduce liability of breakage of the latter.

FRANK S. PEDDER.
CHARLES I. LONGENECKER.